United States Patent
Garrido-Lopez et al.

(10) Patent No.: US 9,355,566 B2
(45) Date of Patent: May 31, 2016

(54) SYSTEMS AND METHODS FOR CONTROLLING AIRCRAFT ARRIVALS AT A WAYPOINT

(71) Applicant: The Boeing Company, Chicago, IL (US)

(72) Inventors: David Garrido-Lopez, Tres Cantos (ES); Ramon Gomez Ledesma, Madrid (ES)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/482,842

(22) Filed: Sep. 10, 2014

(65) Prior Publication Data

US 2015/0081198 A1     Mar. 19, 2015

(30) Foreign Application Priority Data

Sep. 13, 2013   (EP) ..................................... 13382355

(51) Int. Cl.
*G05D 1/00*   (2006.01)
*G08G 5/00*   (2006.01)

(52) U.S. Cl.
CPC ..................................... *G08G 5/0039* (2013.01)

(58) Field of Classification Search
None
See application file for complete search history.

(56) References Cited

U.S. PATENT DOCUMENTS

| | | | |
|---|---|---|---|
| 7,412,324 B1* | 8/2008 | Bagge ..................... | G08G 5/025 340/948 |
| 7,912,593 B2* | 3/2011 | Ridenour ............. | G08G 5/0008 244/183 |
| 8,112,224 B2* | 2/2012 | Lucas ................... | G08G 5/0043 244/76 R |
| 8,140,252 B2* | 3/2012 | Wise ...................... | G01C 21/00 701/120 |

(Continued)

OTHER PUBLICATIONS

Favennec, et al., "Point Merge Integration of Arrival Flows Enabling Extensive RNAV Application and Continuous Descent—Operational Services and Environment Definition," retrieved from [URL: http://www.eurocontrol.int/eec/gallery/content/public/document/eec/report/2008/003_Point_Merge_OSED_V2.0.pdf] on Sep. 10, 2014, Eurocontrol Experimental Centre, Jul. 19, 2010, 124 pages.

(Continued)

*Primary Examiner* — Jonathan M Dager
(74) *Attorney, Agent, or Firm* — Hanley, Flight & Zimmerman, LLC

(57) ABSTRACT

Example systems and methods for controlling aircraft arrivals at a waypoint are disclosed. An example method for controlling aircraft arrivals at a merging waypoint includes defining a tie waypoint at a first distance from the merging waypoint and generating a first parameter set of flight instructions for aircraft arriving at the tie waypoint. The first parameter set includes an aircraft speed instruction for a target separation between a first aircraft arriving at a target waypoint downstream of the tie waypoint and a second aircraft arriving at the target waypoint. The example method includes defining a diversionary flight path at a second distance from the merging waypoint. The second distance is less than the first distance. The method also includes generating a second parameter set of flight instructions for the aircraft arriving at the diversionary flight path. In the example method, the second parameter set includes instructions for the first aircraft to follow at least a part of the diversionary flight path before flying to the merging waypoint. A total flight path distance of the first aircraft is to increase when an expected arrival of the first and second aircraft at the target waypoint has a separation that is smaller than a threshold separation.

18 Claims, 7 Drawing Sheets

(56) References Cited

U.S. PATENT DOCUMENTS

| | | | | |
|---|---|---|---|---|
| 8,332,145 B2* | 12/2012 | Dacre-Wright | G05D 1/101 | 701/3 |
| 8,473,120 B2* | 6/2013 | Blanchon | G05D 1/0005 | 701/3 |
| 8,676,403 B2* | 3/2014 | Garrido-Lopez | G05D 1/101 | 244/175 |
| 8,718,912 B2* | 5/2014 | Wachenheim | G08G 5/0052 | 701/120 |
| 8,862,373 B2* | 10/2014 | Dacre-Wright | B64C 19/00 | 701/121 |
| 9,026,275 B1* | 5/2015 | Young | G08G 5/0021 | 701/11 |
| 2006/0200279 A1* | 9/2006 | Ainsworth | G08G 5/025 | 701/16 |
| 2006/0273928 A1* | 12/2006 | Van Boven | G05D 1/0676 | 340/945 |
| 2007/0061055 A1* | 3/2007 | Stone | G01S 13/913 | 701/2 |
| 2007/0078572 A1* | 4/2007 | Deker | G08G 5/0013 | 701/3 |
| 2008/0249669 A1* | 10/2008 | Skarman | G08G 5/0078 | 701/3 |
| 2009/0088972 A1* | 4/2009 | Bushnell | G01C 23/005 | 701/414 |
| 2010/0217510 A1* | 8/2010 | Deker | G08G 5/045 | 701/120 |
| 2012/0179368 A1* | 7/2012 | Walter | G01C 21/20 | 701/465 |
| 2014/0067245 A1* | 3/2014 | Polansky | G05D 1/0202 | 701/121 |
| 2014/0081482 A1* | 3/2014 | Raynaud | G05D 1/12 | 701/3 |
| 2014/0188378 A1* | 7/2014 | Sawhill | G08G 5/0013 | 701/122 |
| 2014/0257598 A1* | 9/2014 | Bailey | G05D 1/101 | 701/3 |
| 2014/0350755 A1* | 11/2014 | Caillaud | G08G 5/02 | 701/18 |

OTHER PUBLICATIONS

Johnson et al., "Human-in-the-Loop (HITL) Simulation and Analysis of Optimized Profile Descent (OPD) Operations at Atlanta," 9th AIAA Aviation Technology, Intergration and Operations Conference, 2009, 12 pages.

INECO, "OPTA Background," retrieved from [URL:http://opta.ineco.es/OPTA/html/background_en.jsp] on Sep. 10, 2014, 2 pages.

Extended European Search Report, issued by the European Patent Office in connection with European Patent Application No. 13382355.9, on Apr. 3, 2014, 5 pages.

* cited by examiner

SYSTEMS AND METHODS FOR CONTROLLING AIRCRAFT ARRIVALS AT A WAYPOINT

RELATED APPLICATION

This patent claims priority to European Patent Application No. 13382355.9, filed Sep. 13, 2013, and entitled "Method for Controlling Aircraft Arrivals at a Waypoint," which is hereby incorporated by reference in its entirety.

FIELD OF DISCLOSURE

This disclosure relates to aircraft arrivals at a waypoint and, more particularly, to systems and methods for controlling aircraft arrivals at a waypoint.

BACKGROUND

Aircraft arrive at a landing site or airfield from many different directions and typically merge or converge into a single arrival stream before landing. This convergence ensures an orderly delivery to arrival and approach. A merging waypoint is used to define the merging point downstream of a terminal or runway at the airfield. Multiple aircraft routes are joined at the merging waypoint, and each aircraft follows the same path from the merging waypoint to the runway. However, prior the merging waypoint, the incoming aircraft need to be synchronized in time and spacing to allow for other aircraft to fit into the overall flow while maintaining a minimum separation between aircraft.

In general, a Continuous Descent Arrival (CDA) is an optimal arrival path or route for an aircraft towards a merging waypoint. In a CDA, the descent toward the merging waypoint is performed at near idle thrust values with little or no tactical intervention from Air Traffic Control (ATC). As such, a CDA results in optimum fuel, emissions and noise savings. However, with a CDA, it is difficult to systematically keep the aircraft flights separated in higher traffic density conditions because of inherent uncertainties associated with these operations. Therefore, ATC is employed to resolve conflicts between arriving aircraft and ensures that the aircraft remain separated at the merging waypoint.

The arrivals problem may be considered as a series of pairs of aircraft that converge to the same merging waypoint. In other words, solving an arrivals problem may be thought of as solving each one of these pair wise conflicts. Depending on the aircraft positions and speeds, the aircraft may stay separated without the need for ATC intervention. However, the ATC maintains control and takes actions to ensure appropriate separation.

Pair wise conflicts are solved by the ATC using one of the following two known techniques, both of which operate by attempting to cause a time delay in one of the aircraft in order to build sufficient spacing between the aircraft pair at the merging waypoint. The first technique is a radar vectoring or path stretching concept. Prior to reaching the merging waypoint, one of the aircraft is given a new lateral path that is relatively longer than a nominal path, thereby causing a delay in one of the aircraft. The Eurocontrol Point Merge (PM) procedure, for example, is a known procedure that follows the radar vectoring or path stretching concept. The PM procedure causes one of the aircraft to hold altitude and extend its flight path to solve the conflict. In general, this procedure has a relatively high success rate. However, because of the longer flight path and the altitude holding requirements, the PM procedure results in higher fuel use.

The second technique is a speed control concept. Prior to reaching the merging waypoint, one of the aircraft is slowed down, thereby causing a delay in the aircraft. The Optimized Profile Descent (OPD) procedure, for example, is a known procedure that utilizes the speed control concept to avoid conflicts while keeping the aircraft on the nominal path. The OPD procedure enables aircraft to more easily to complete CDAs and, thus, perform more fuel efficient descents. However, speed control often does not provide sufficient latitude to solve all of the pair wise conflicts and, thus, ATC intervention is still needed.

SUMMARY

The present disclosure provides improved systems and methods for controlling the arrival of aircraft at a waypoint.

An example method of controlling aircraft arrivals a merging waypoint is disclosed herein. The example method includes defining a tie waypoint at a first distance from the merging waypoint and generating a first parameter set of flight instructions for aircraft arriving at the tie waypoint. The first parameter set includes an aircraft speed instruction for a target separation between a first aircraft arriving at a target waypoint downstream of the tie waypoint and a second aircraft arriving at the target waypoint. The example method includes defining a diversionary flight path at a second distance from the merging waypoint, where the second distance is less than the first distance. The method also includes generating a second parameter set of flight instructions for the aircraft arriving at the diversionary flight path. In the example method, the second parameter set includes instructions for the first aircraft to follow at least a part of the diversionary flight path before flying to the merging waypoint. A total flight path distance of the first aircraft is to increase when an expected arrival of the first and second aircraft at the target waypoint has a separation that is smaller than a threshold separation.

An example system disclosed herein includes a processor coupled to a memory, the processor configured to execute instructions stored on the memory to calculate a tie waypoint at a first distance from a merging waypoint and generate a first parameter set of flight instructions for a first aircraft and a second aircraft that arrive at the tie waypoint. The first parameter set of flight instructions include aircraft speed instructions for the first and second aircraft. The processor in the example system is further configured to calculate a diversionary flight path at a second distance from the merging way point, where the second distance is less than the first distance, determine if the first and second aircraft are to arrive at the merging waypoint with a separation that is less than a threshold and generate a second parameter set of flight instructions for at least one of the first aircraft or the second aircraft to follow at least a portion of the divisionary flight path before flying to the merging way point when the separation is less than the threshold.

DESCRIPTION

In the following description, and in the claims, the terms "first" and "second" are employed. It is explicitly to be understood that these terms do not signify any particular order to the calculations. In particular, although in some examples the initial OPD parameters are determined before the initial PM parameters, and then both parameter sets are iteratively converged turn starting with the OPD parameters, in other examples the calculations may be performed starting with the PM parameters.

Additionally, tie waypoints and PM arcs are described and claimed in terms of separations from a merging waypoint. However it will be understood that this is merely for convenience, provided that the separation between the PM arcs and the merging waypoint is less than the separation between the tie waypoint and the merging waypoint, it is a matter of convention and convenience as to how (and against what fixed locus) the locations of the PM arcs and tie waypoint are defined.

Before describing the example systems and methods of the present disclosure, a more detailed explanation of the Eurocontrol Point Merge (PM) and Optimized Profile Descent (OPD) procedures is provided. The PM procedure has the objective of spacing descending aircraft into a merging waypoint. Arriving aircraft are enabled to descend continuously without tactical intervention from Air Traffic Control (ATC). About ten nautical miles (NM) prior to reaching the merging waypoint, the PM procedure is applied to eliminate conflicts at the merging waypoint. In other examples, the PM procedure may be implemented at any suitable distance prior to reaching the merging waypoint.

Figure 1:
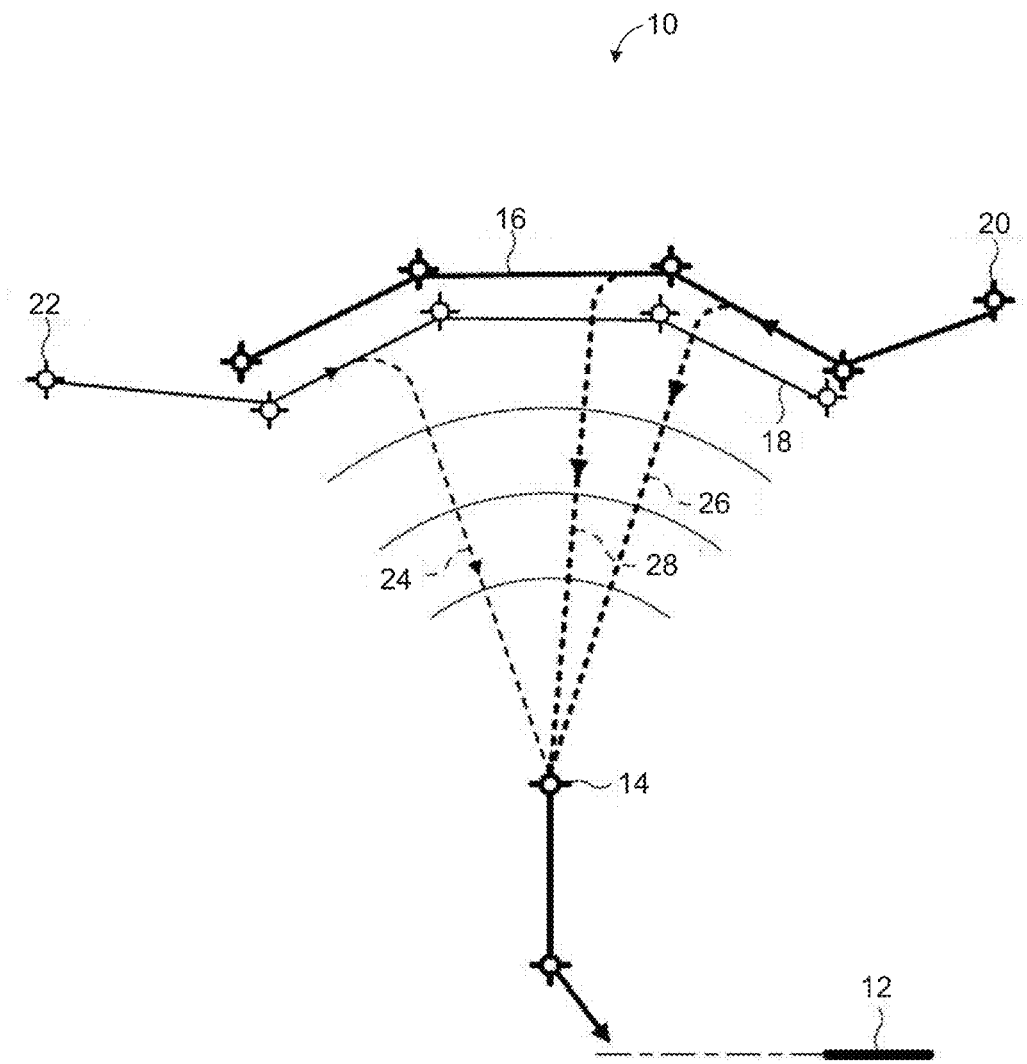
FIG. 1 illustrates a schematic of example flight paths for aircraft arriving towards a merging waypoint implemented in accordance with the Eurocontrol Point Merge (PM) procedure.

FIG. 1 illustrates a schematic 10 of example aircraft flight paths arriving at a runway 12, in accordance with the PM procedure. In the illustrated example, a merging waypoint 14 is provided proximal an airport. The PM procedure includes defining at least two lateral trajectories. In the illustrated example, a first trajectory 16 and a second trajectory 18 are defined. The trajectories 16, 18 are substantially circular or arc shaped and spaced at a constant distance (e.g., approximately 10 NM) from the merging waypoint 14. The trajectories 16, 18 are defined by Precision Area Navigation (P-RNAV) waypoints. The trajectories 16, 18 are constrained in speed and altitude so that two aircraft each flying in one of the trajectories 16, 18 are separated by altitude and controlled by speed.

In accordance with the PM procedure, each aircraft arriving from a first flight path 20 (e.g., a right flight path) is to level-off, maintain altitude and speed, and follow the first trajectory 16 (which appears slightly further from the merging waypoint 14 in FIG. 1). Similarly, each aircraft that arrives following a second flight path 22 (e.g., a left flight path), is to level-off, maintain altitude and speed, and follow the second trajectory 18 (which appears slightly closer to the merging waypoint 14 in FIG. 1). This operation is monitored by an ATC Operator (ATCO) (e.g., an air traffic controller). If there is no aircraft between the trajectories 16, 18 and the merging waypoint 14, or preceding aircraft are sufficiently far beyond the trajectories 16, 18, the ATCO sends a command (e.g., a DIRECT command) to the aircraft. This command instructs the aircraft to immediately leave its trajectory (e.g., one of the trajectories 16, 18) and descend toward the merging waypoint 14. For example, in FIG. 1, a flight path 24 is illustrated as leaving the second trajectory 18 and descending toward the merging waypoint 14.

On the other hand, if the spacing with any preceding aircraft is below a given threshold (e.g., a target threshold), the ATCO does not instruct the aircraft to leave it trajectory (e.g., one of the trajectories 16, 18). For example, if there is congestion at the merging waypoint 14, an aircraft approaching from the first flight path 20 and traveling along the first trajectory 16 may be delayed from departing from the first trajectory 16. For example, instead of following a flight path 26 (e.g., a relatively shorter flight path) to the merging waypoint 14, the aircraft continues along the first trajectory 16 until subsequently receiving the command (e.g., DIRECT) that instructs it to go directly to the merging waypoint 14 via a flight path 28 (e.g., a relatively longer flight path). The total length of the flight path 28 (which includes the portion traveled along the first trajectory 16) is longer than that of the flight path 26. As a result, the aircraft has a delayed arrival time at the merging waypoint 14 in the former case relative to the latter. In this manner, aircraft arriving at the merging waypoint 14 have a minimum separation. Therefore, ATCO interventions between the merging waypoint 14 and the runway 12 are avoided.

One of the advantages of the PM procedure is that it allows for fully automatic navigation of the aircraft and, ideally, only a single final clearance communication or command is received from the ATCO. Another advantage is that if performed effectively, the PM procedure can resolve a majority of the potential conflicts at the merging waypoint 14. Further, the PM procedure is automatic and it may be loaded in aircraft flight management systems, because it has two P-RNAV arrivals.

However, the PM procedure also has drawbacks. For example, with the PM procedure, aircraft flights are forced to level-off and maintain altitude for several additional miles. Additionally, the arc trajectories 16, 18 are perpendicular to the natural or nominal arrival direction (e.g., directly towards the merging waypoint 14), which leads to a longer descent. As a result, fuel consumption and total flight time increase.

Figure 2:
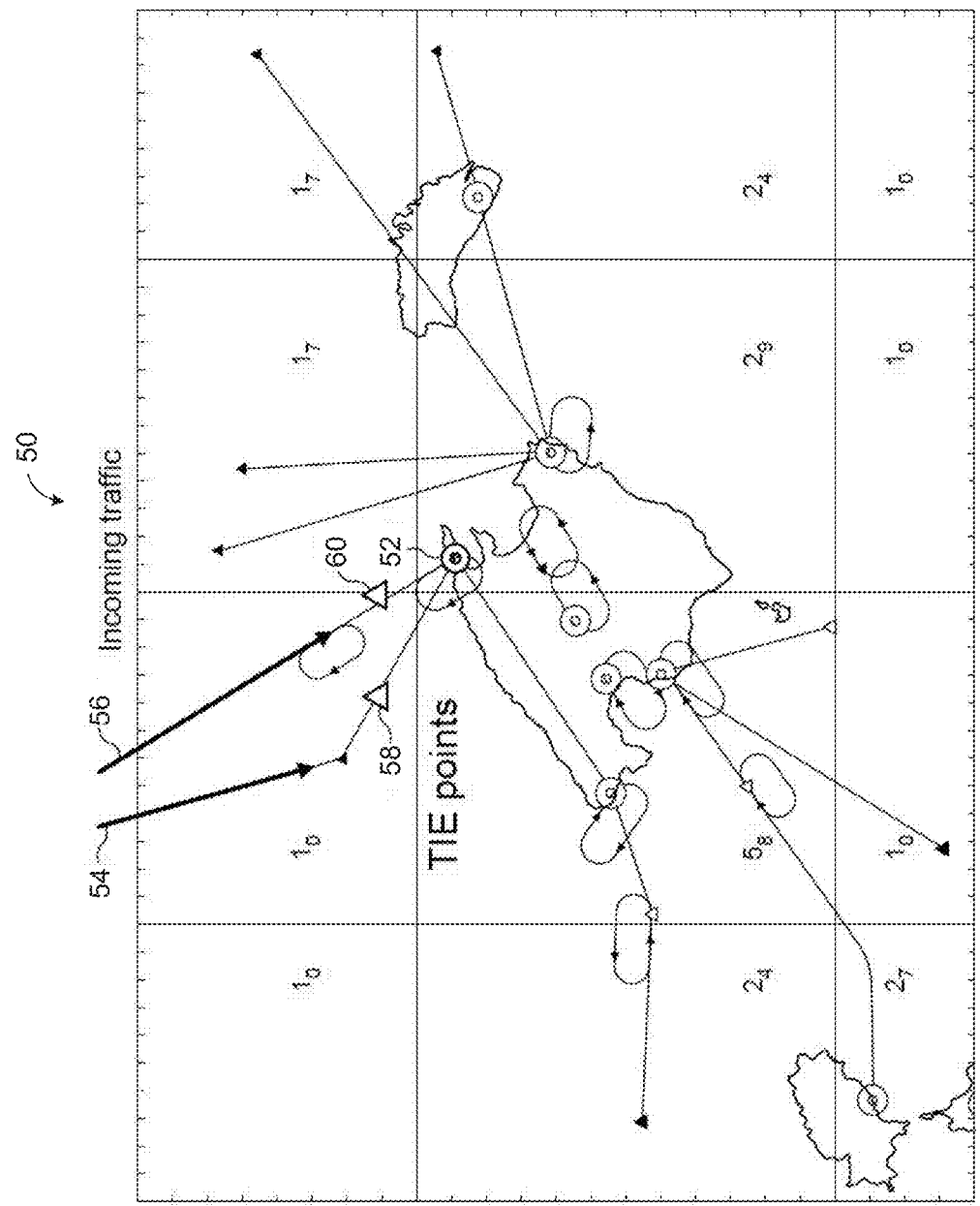
FIG. 2 illustrates a schematic of example flight paths for aircraft arriving towards a merging waypoint implemented in accordance with the Optimized Profile Descent (OPD) procedure.

FIG. 2 is a schematic 50 of example flight paths for aircraft arriving at a merging waypoint 52 before arrival at an airport (e.g., Palma de Majorca airport), in accordance with the OPD procedure. A first flight path 54 and a second flight path 56 are illustrated. The flight paths 54, 56 each include a tie waypoint 58, 60, respectively, at a distance of, for example, about 30 NM from the merging waypoint 52. In other examples, the tie waypoints 58, 60 can be located at any suitable distance from the merging waypoint 52. The tie waypoints 58, 60 are established to permit CDAs that are free of conflict at the merging waypoint 52.

In the example OPD procedure illustrated in FIG. 2, the ATCO monitors every aircraft that passes over each of the tie waypoints 58, 60. Depending on the distance between two aircraft, when one of the aircraft passes one of the tie waypoints 58, 60, the ATCO may request a deceleration to the trailing aircraft (e.g., the second or later aircraft to arrive at one of the tie waypoints 58, 60). In some examples, the deceleration is based on a pre-computed look-up table. Additionally, to make the procedure effective, aircraft are to follow altitude windows established in the procedure (e.g., hence the name of Optimized Profile Descent).

Therefore, in the example OPD procedure, standard arrivals are preserved, so that aircraft fly toward the merging waypoint 52 using relatively straight trajectories 54, 56. As a result, the flight paths may be as short as conditions permit.

Figure 3:
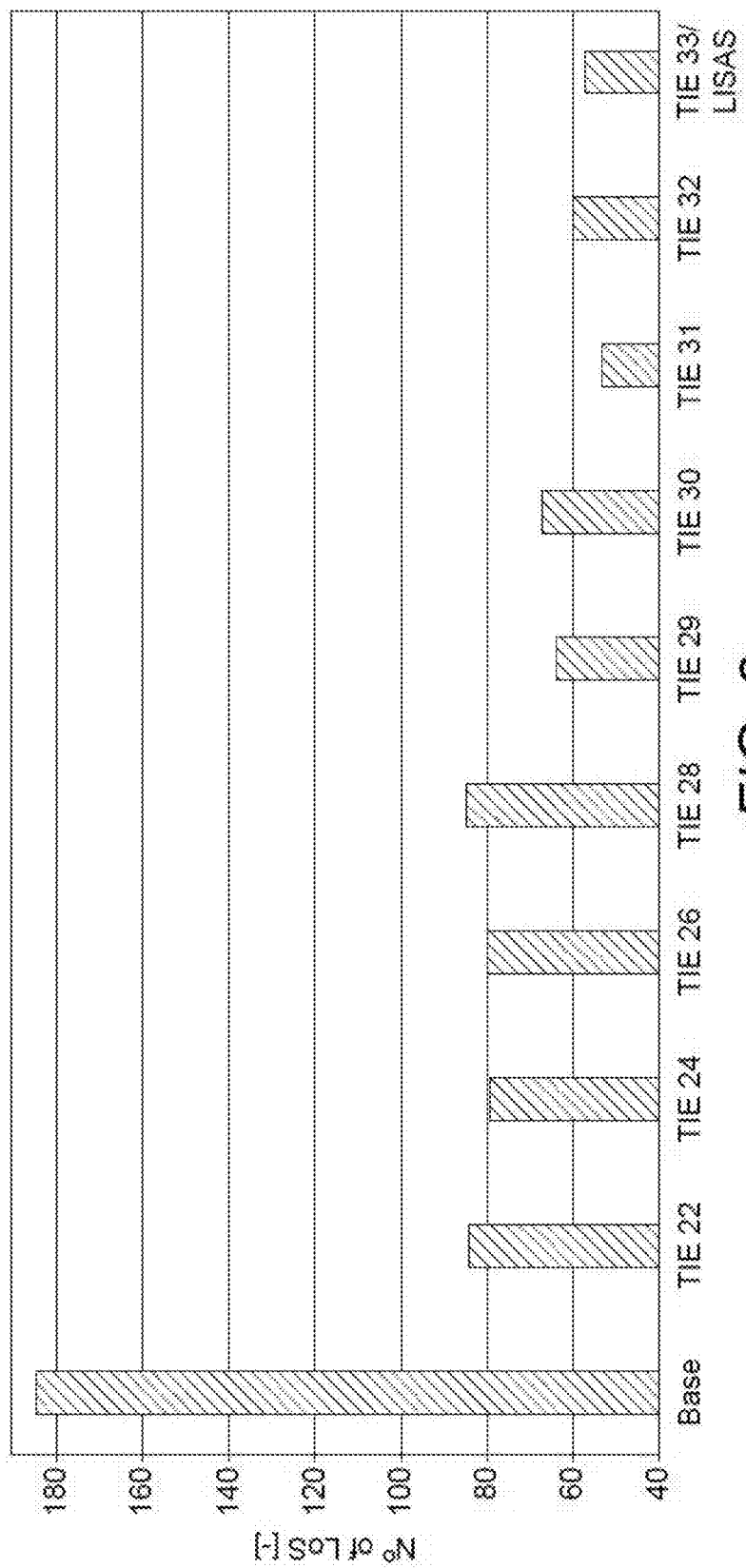
FIG. 3 is a bar chart illustrating an example of the total number of conflicts for aircraft arriving at a merging waypoint from various tie waypoints as implemented in accordance with the OPD procedure of FIG. 2.

Simulations of arrivals into Palma de Majorca airport using the OPD procedure were carried out using a plurality of different separations between the tie waypoints 58, 60 to the merging waypoint 52. The results are illustrated in FIG. 3 in the form of a bar chart. The vertical axis of the bar chart represents the total number of expected conflicts and the horizontal axis of the bar chart represents a range of different tie waypoint to merging waypoint separations. The left hand bar "Base" represents the total number of conflicts in the case of no intervention by the ATCO.

As illustrated in the example bar chart of FIG. 3, not all the conflicts can be resolved. Conflicts were reduced from about 180 without the OPD procedure (e.g., the left hand bar) to fewer than 100 once the OPD procedure was implemented (e.g., applied). However, even at an apparent optimal tie waypoint to merging waypoint separation (e.g., around 31 NM), about 50 of the 180 flights were still predicted to conflict at the merging waypoint when using the OPD procedure. These remaining 50 conflicts then have to be resolved by ATCO tactical intervention. This way of solving remaining conflicts is expensive for flights and also for controllers (e.g., in terms of workload). Therefore, although the OPD procedure resolves a portion (e.g., a majority) of the conflicts and permits relative clean descents, a number of conflicts may still have to be resolved via tactical ground control interventions.

Example systems and methods for controlling aircraft arrivals at a waypoint (e.g., a merging waypoint) are disclosed herein. In some examples, a first waypoint (e.g., a tie waypoint) is defined at a first distance (e.g., 30 NM) from a merging waypoint. At the first waypoint, aircraft speeds are adjusted (e.g., via flight instructions to the aircraft) to permit the aircraft to descend continuously (e.g., via a CDA). In some examples, this speed control technique follows the OPD procedure or concept. Between the first waypoint and the merging waypoint is a second waypoint, which is a second distance (e.g., 10 NM) from the merging waypoint. At the second waypoint, the PM procedure or concept (e.g., via a diversionary flight path) is applied (e.g., via flight instructions to the aircraft) to eliminate the remaining potential conflicts. The example combination of early OPD procedure and late PM procedure produces a synergistic effect that is derived when the parameters of one part of the arrival control procedure algorithm (e.g., the PM procedure parameters) are used to alter and improve the parameters of the other part of the arrival control algorithm (e.g., the OPD procedure parameters).

In an example method of implementing the example aircraft arrival procedure, initial OPD and PM parameters are each determined empirically and independently. Then, the initial OPD parameters are recalculated while holding the initial PM parameters fixed. Subsequently, the initial PM parameters are recalculated with the recalculated OPD parameters held fixed. Thus, because each part of the arrival algorithm interacts with the other, the OPD and PM parameters converge. This procedure that occurs when one part of the parameter set (e.g., the OPD parameters) is held fixed while the other part (e.g., the PM parameters) is optimized, and then vice versa, and may be repeated, iteratively until one or both of the OPD and PM parameters satisfies a convergence criterion (e.g., at least one of the OPD parameters and/or PM parameters change by less than a predetermined amount or percentage from iteration to iteration). Thus, the example procedure produces a result that optimizes aircraft descent strategy for efficiency without conflicts.

Figure 4:
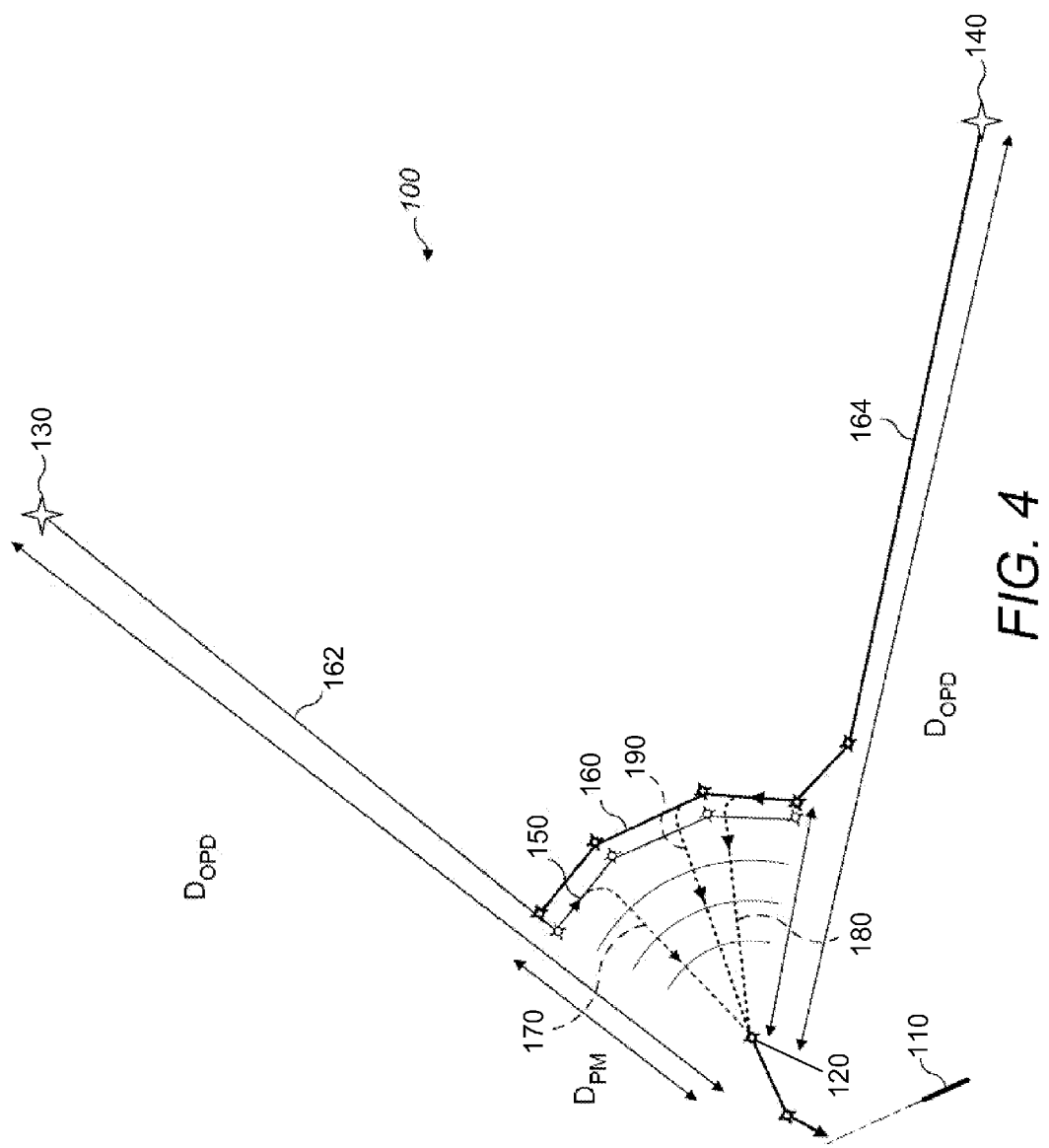
FIG. 4 illustrates a schematic of example flight paths for aircraft arriving toward a merging waypoint using an example aircraft arrival procedure in accordance with the teachings of this disclosure.

FIG. 4 illustrates a schematic diagram of example flight paths for aircraft using an example aircraft arrival procedure 100. The example procedure 100 follows an example combined early OPD and late PM concept for controlling the arrival of aircraft to a runway 110. In the illustrated example, a merging waypoint 120 is defined proximate the runway 110. In the illustrated example, descending aircraft arrive at one of two tie waypoints 130, 140 and are monitored at the two tie waypoints 130, 140. Each of the tie waypoints 130, 140 lies at a distance $D_{OPD}$ upstream of the merging waypoint 120. The distance $D_{OPD}$ for each of the tie waypoints 130, 140 can be the same or different distances.

In accordance with the example procedure 100, a look-up table is then generated for an ATCO that is supervising and controlling the aircraft arrivals. The table is displayed prominently to the ATCO and includes a list of successively slower speeds for shorter distances between aircraft reaching the tie waypoints 130, 140. In some examples, the look-up table is calculated based on simulations of a sequence of real flights of the specific airspace configuration, real weather conditions and/or realistic aircraft guidance and performance. In some examples, the fundamental parameter that affects the table values is the target capacity at the merging waypoint 120. Also, other procedural constraints such as vertical constraints (e.g., altitude) and speed constraints at the merging waypoint 120 may strongly affect the resulting table.

In the example procedure 100, commands (e.g., speed instructions) are sent to the aircraft as the aircraft arrive at the respective tie waypoints 130, 140. The commanded decelerations allow the aircraft to remain on a continuous descent path (e.g., although with airspeed intervened). As a result, the probability or likelihood of conflict between aircraft at the merging waypoint 120 is reduced. As illustrated in FIG. 3, using the OPD procedure alone allows, according to example simulations, a reduction from around 180 potential conflicts (e.g., with no OPD procedure), down to about 50 interventions (e.g., OPD procedure with tie waypoints at 31 NM upstream of the merging waypoint).

After calculating an initial set of OPD parameters, which permits speed interventions during a first, relatively early part of the flight path from the tie waypoints 130, 140 towards the merging waypoint 120, a PM procedure is then implemented. In the illustrated example, a set of PM arc trajectories 150, 160 (e.g., diversionary flight paths) are defined at a distance $D_{PM}$ (e.g., about 10 NM) from the merging waypoint 120. The distance $D_{PM}$ may be any suitable distance from the merging waypoint 120. The PM arc trajectories 150, 160 are lateral to the merging waypoint 120. The PM arc trajectories 150, 160 may be similar to, for example, the arc trajectories 30, 40 of FIG. 1

As illustrated in FIG. 4, upon arrival at the trajectories 150, 160, every aircraft is to navigate along the trajectories 150, 160 until the ATCO observes that all preceding flights are sufficiently spaced with respect to the aircraft. For example, a first aircraft may arrive from the tie waypoint 130 to the first arc trajectory 150 along a flight path 162, travel a short distance along that first arc trajectory 150, and then upon receipt of a command (e.g., a DIRECT command), proceeds along a flight path 170 to the merging waypoint 120 and from there onto the runway 110.

A second aircraft may arrive from the second tie waypoint 140, by contrast, at the second arc trajectory 160 along a flight path 164, for example. If the aircraft were immediately to divert from that arcuate path towards the merging waypoint 120 along a flight path 180, however, then this would result in a potential conflict with the aircraft arriving along the flight path 170 at the merging waypoint 120. Thus, the aircraft traveling along the second trajectory 160 instead continues further around the second trajectory 160 until a command instruction is received, at which point the aircraft proceeds directly to the merging waypoint 120 along a flight path 190. In the illustrated example, using the flight path 190 results in a longer flight path than the flight path 180, which enables the aircraft to arrive at the merging waypoint relatively later. Thus, all conflicts are resolved without high-workload and/or expensive tactical interventions. In some examples, each aircraft receives only a single, final command instruction (e.g., indicating clearance to go directly to the merging waypoint 120) from the ATCO.

Figure 5:
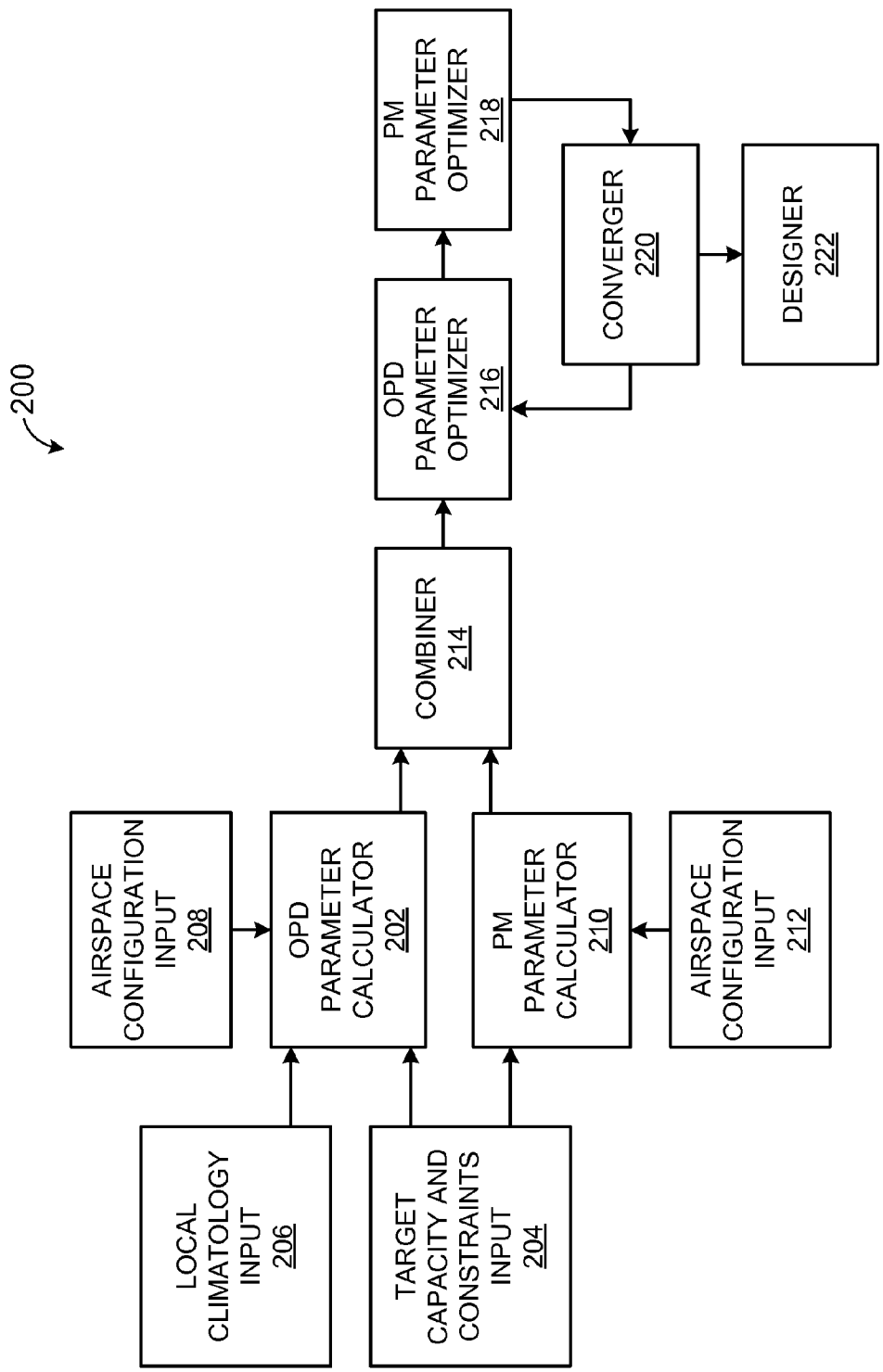
FIG. 5 is a block diagram of an example flight management system for controlling the arrival of aircraft and implementing the example aircraft arrival procedure of FIG. 4.

FIG. 5 is a block diagram representing an example flight management system 200 to implement the example procedure 100 of FIG. 4 for controlling aircraft arrivals at a waypoint. The flight management system 200 includes an OPD parameter calculator 202 to calculate a set of first parameters or OPD parameters for the OPD procedure. The first parameters are in the form of a look-up table that includes commanded speeds for different separations at the merging waypoint 120. In some examples, the tables indicate how much a trailing aircraft must decelerate as a function of a distance of a leading aircraft from its tie waypoint. In performing the calculations, the calculator 202 also determines a distance $D_{OPD}$ from one or both the tie waypoints 130, 140 to the merging waypoint 120.

In the illustrated example, the calculation of the first parameters is based on one or more parameters or inputs (e.g., primary inputs). However, in other examples, other secondary inputs may be included. In the example flight management system 200, a first input 204 is a target of spacing between aircraft at the merging waypoint 120. The target of spacing affects the OPD parameter calculations. For example, the larger the spacing that is imposed, the greater the decelerations that must be imposed upon aircraft in order to achieve the target spacing. A second input 206 is local climatology data. For example, several days of weather data (e.g., aloft winds and/or temperatures) may be input into the OPD parameter calculator 202. A third input 208 is airspace configuration (e.g., a real (or realistic) sequence of traffic is employed).

In some examples, it is desirable to optimize the distance $D_{OPD}$ between the tie waypoints 130, 140 and the merging waypoint 120. Too short of a distance between the tie waypoints 130, 140 and the merging waypoint 120 leads to poor OPD procedure performance because there is little room for the decelerations to elongate the spacing between aircraft. On the other hand, too long a distance between the tie waypoints 130, 140 and the merging waypoint 120 also compromises OPD procedure performance because uncertainties in weather and/or aircraft performance degrade the efficiency of early speed interventions.

In the illustrated example, a set of fast-time traffic simulations (e.g., a first set of simulations) is run with realistic aircraft flight plans, performance, and navigation using the first, second and third input 204, 206, 208 data. In particular, the OPD parameter calculator 202 determines the first parameters or OPD parameters based upon speed constraint prior to the tie waypoints 130, 140. The concept of the OPD procedure requires that all flights reach the tie waypoints 130, 140 at the same indicated airspeed, which can be accomplished, for example, by acceleration and/or deceleration by one or more aircraft. In some examples, the airspeed value is fixed, and is not changed throughout the simulations. The result is a set of speed (SPD) tables and an optimized distance $D_{OPD}$ for the OPD procedure. The speed tables indicate to the ATC how much a trailing aircraft should decelerate as a function of the distance of a leading aircraft to (e.g., from) its own tie waypoint. Initially, approximate speed tables are calculated for several values of the distance $D_{OPD}$ using worst-case-scenario weather data. One simulation per value of the distance $D_{OPD}$ is run. The optimal $D_{OPD}$ value is the one that leads to a minimum of conflicts. Once this is completed, the speed table is refined using simulation results. In the illustrated example, the OPD parameter calculator 202 determines the altitude windows that define the optimized profile. In some examples, the altitude windows are determined statistically from the trajectories of all aircraft.

The example flight management system 200 includes a PM parameter calculator 210 to calculate a set of second parameters or PM parameters for the PM procedure. The calculation of the second parameters is based on one or more parameters or inputs (e.g., primary inputs). However, in other examples, other suitable parameters (e.g., secondary parameters) may be included. In the illustrated example, the first input 204 of the PM calculator 210 is the target of spacing at the merging waypoint 120. The target of spacing may affect the PM parameter calculations. For example, the greater the spacing that is imposed, the greater the radius of the arc trajectories (e.g., the arc trajectories 150, 160) must be. A second input 212 of the PM calculator 210 is airspace configuration (e.g., which may be similar to the third input 208 for the OPD procedure). In some examples, the airspace configuration input 212 is based on a real (e.g., or realistic) sequence of traffic employed.

In the illustrated example, a set of fast-time traffic simulations (e.g., a second set of simulations) is run with realistic aircraft flight plans, performance, and navigation. In some examples, the PM parameter calculator uses the weather data (e.g., from the local climatology input 206). In the illustrated example, the PM parameter calculator 210 determines three parameters (e.g., the second parameters). A first PM parameter is speed constraint prior to the arc trajectories 150, 160 (e.g., the divisionary flight path(s)). As disclosed, in some examples, aircraft should arrive at the tie waypoints 130, 140 at a fixed speed. In some examples, the PM procedure requires that all flights also reach the arc trajectories 150, 160 at the same indicated airspeed. In some examples, this value is fixed and is not changed throughout the simulations.

In order that both the speeds at the tie waypoints 130, 140 and upon arrival at the arc trajectories 150, 160 are fixed, while allowing variation of speed from aircraft to aircraft between those two locations in accordance with the initial OPD procedure, the OPD procedure includes a final, relatively brief speed correction as each aircraft approaches the arc trajectories 150, 160. This final part of the flight from the tie waypoint 130, 140 to the arc trajectories 150, 160 can be relatively short because the distance required to decelerate to the fixed speed mandated at the arc trajectories 150, 160 can be relatively short (e.g., in comparison with the total distance from the tie waypoint 130, 140 to the arc trajectories 150, 160, the flight paths 162, 164). For example, the total separation between the tie waypoints 130, 140 and the arc trajectories 150, 160 may be about 15-25 NM, depending upon the specific parameters/design.

The block deceleration distance over which aircraft decelerate, so as to arrive at the fixed speed (e.g., 210 knots) at the arc trajectories 150, 160, may be around 5 NM, for example. Thus, aircraft speeds optimized for the OPD procedure may be maintained for the majority of the period (e.g., the distance) from the tie waypoints 130, 140 to the arc trajectories 150, 160.

In some examples, it is anticipated that the relatively short period of deceleration to the fixed speed at the arc trajectories 150, 160 should be included in the overall OPD section calculations. In some examples, this results in the tie waypoint 130, 140 being somewhat further from the merging waypoint 120 than otherwise, to accommodate the final deceleration to the fixed speed.

A second PM parameter is the distance $D_{PM}$, which is the distance from the arc trajectories 150, 160 to the merging waypoint 120. This parameter is preferably optimized. For example, too short of a distance $D_{PM}$ leaves no room to de-conflict incoming traffic. However, too long a distance $D_{PM}$ leads to a substantial part of the arrival period being affected by the PM procedure and, thus, the inherent drawbacks of the PM method (e.g., in terms of time and fuel efficiency) are realized. In some examples the optimal distance $D_{PM}$ is larger (e.g., slightly larger) than the distance for which all conflicts are resolved.

A third PM parameter is an altitude constraint $H_{PM}$ at the arc trajectories 150, 160. The altitude constraint $H_{PM}$ value is directly dependent on $D_{PM}$. In some examples, the arc trajectories 150, 160 are to be separated in distance, so one of the arc trajectories (e.g., the arc trajectory 150) is placed at a different distance from the merging waypoint 120, to another of the arc trajectories (e.g., the arc trajectory 160). Also, in some examples the arc trajectories 150, 160 are to be separated by altitude. These altitudes are a product of the simulation, by statistically obtaining the average altitude profiles of all the flights.

Once the OPD parameter calculator 202 and the PM parameter calculator 210 have independently calculated the preliminary OPD and PM parameters, a combiner 214 uses an iterative process to combine the OPD and PM procedures. In some examples, the set of simulations in the calculation of the OPD parameters is to be repeated to calculate (e.g., or recalculate) the optimal OPD parameters in view (e.g., under the influence of) the PM parameters (e.g., which force the aircraft deconflicting at the merging waypoint 120). In the illustrated example, an OPD parameter optimizer 216 is to recalculate the OPD parameters while the PM parameters are held fixed (e.g., kept constant). The altitude and speed constraints (e.g., the PM parameters) from the PM procedure alter the parameters of the OPD procedure, particularly the position of tie waypoints 130, 140 and the speed tables. As a result, the distance $D_{OPD}$ increases to leave room for the PM arcs trajectories 150, 160. However, the required decelerations become smaller because of the ability of the PM interventions to space aircraft before the merging waypoint 120. The optimization objective is to reduce fuel consumption as much as possible while maintaining zero conflicts.

After the OPD parameters have been optimized by the OPD parameter optimizer 216, the optimized OPD parameters are to be combined with the PM procedure. In some examples, the second set of simulations in the calculation of the PM parameters are repeated to calculate optimal PM parameters (e.g., or recalculate the PM parameters) using the optimized OPD parameters held fixed. In the illustrated example, a PM parameter optimizer 218 is to recalculate the PM parameters while the optimized OPD parameters are held fixed.

The influence of the optimized OPD parameters on the total parameter set (e.g., the OPD and PM parameters) reduces the potential conflicts prior to the introduction of the PM procedures (e.g., starting at the distance $D_{PM}$ from the merging waypoint 120). Therefore, a reduced distance $D_{PM}$ is expected to eliminate all conflicts. The optimization objective is to reduce fuel consumption while achieving zero conflicts for these simulations and to limit the distance $D_{PM}$, because the shorter that distance $D_{PM}$, the less the overall impact on efficiency (e.g., because the influence on the total parameter set by the PM parameters is minimized).

Because the OPD and PM procedures are complementary, repeating the optimization results in convergence of the OPD and PM parameters. Therefore, the OPD parameter optimizer 216 and the PM parameter optimizer 218 may continue to iteratively, and repeatedly, recalculate their respective parameters until the first parameter set (e.g., the OPD parameters), the second parameter set (e.g., the PM parameters), and the optimization targets (e.g., the distance $D_{OPD}$ and the distance $D_{PM}$) do not change appreciably. In other words, a convergence criterion for at least one of the OPD and PM parameters, plus the distance $D_{OPD}$ and the distance $D_{PM}$, is met. In the example flight management system 200, a converger 220 detects when the parameters (e.g., the OPD parameters, the PM parameters, the distance $D_{OPD}$ and/or the distance $D_{PM}$) converge (e.g., do not change appreciably). If the parameters converge, the converger 220 halts the reiteration process and a designer 222 uses the parameters to design the optimized flight schedule. In the illustrated example, the OPD parameters are optimized first while holding the PM parameters constant. However, in other examples, this process may be reversed, and the PM parameters are optimized first while holding the OPD parameters constant, and so forth. The OPD parameters and the PM parameters converge similarly in either example.

While an example manner of implementing the example aircraft arrival control procedure 100 of FIG. 4 is illustrated in FIG. 5, one or more of the elements, processes and/or devices illustrated in FIG. 5 may be combined, divided, re-arranged, omitted, eliminated and/or implemented in any other way. Further, the example OPD parameter calculator 202, the example target capacity and constraints input 204, the example local climatology input 206, the example airspace configuration input 208, the example PM parameter calculator 210, the example airspace configuration input 212, the example combiner 214, the example OPD parameter optimizer 216, the example PM parameter optimizer 218, the example converger 220, the example designer 222 and/or, more generally, the example flight management system 200 of FIG. 5 may be implemented by hardware, software, firmware and/or any combination of hardware, software and/or firmware. Thus, for example, any of the example OPD parameter calculator 202, the example target capacity and constraints input 204, the example local climatology input 206, the example airspace configuration input 208, the example PM parameter calculator 210, the example airspace configuration input 212, the example combiner 214, the example OPD parameter optimizer 216, the example PM parameter optimizer 218, the example converger 220, the example designer 222 and/or, more generally, the example flight management system 200 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example OPD parameter calculator 202, the example target capacity and constraints input 204, the example local climatology input 206, the example airspace configuration input 208, the example PM parameter calculator 210, the example airspace configuration input 212, the example combiner 214, the example OPD parameter optimizer 216, the example PM parameter optimizer 218, the example converger 220 and/or the example designer 222 is/are hereby expressly defined to include a tangible computer readable storage device or storage disk such as a memory, a digital versatile disk (DVD), a compact disk (CD), a Blu-ray disk, etc. storing the software and/or firmware. Further still, the example flight management system 200 of FIG. 5 may include one or more elements, processes and/or devices in addition to, or instead of, those illustrated in FIG. 5, and/or may include more than one of any or all of the illustrated elements, processes and devices.

Figure 6:
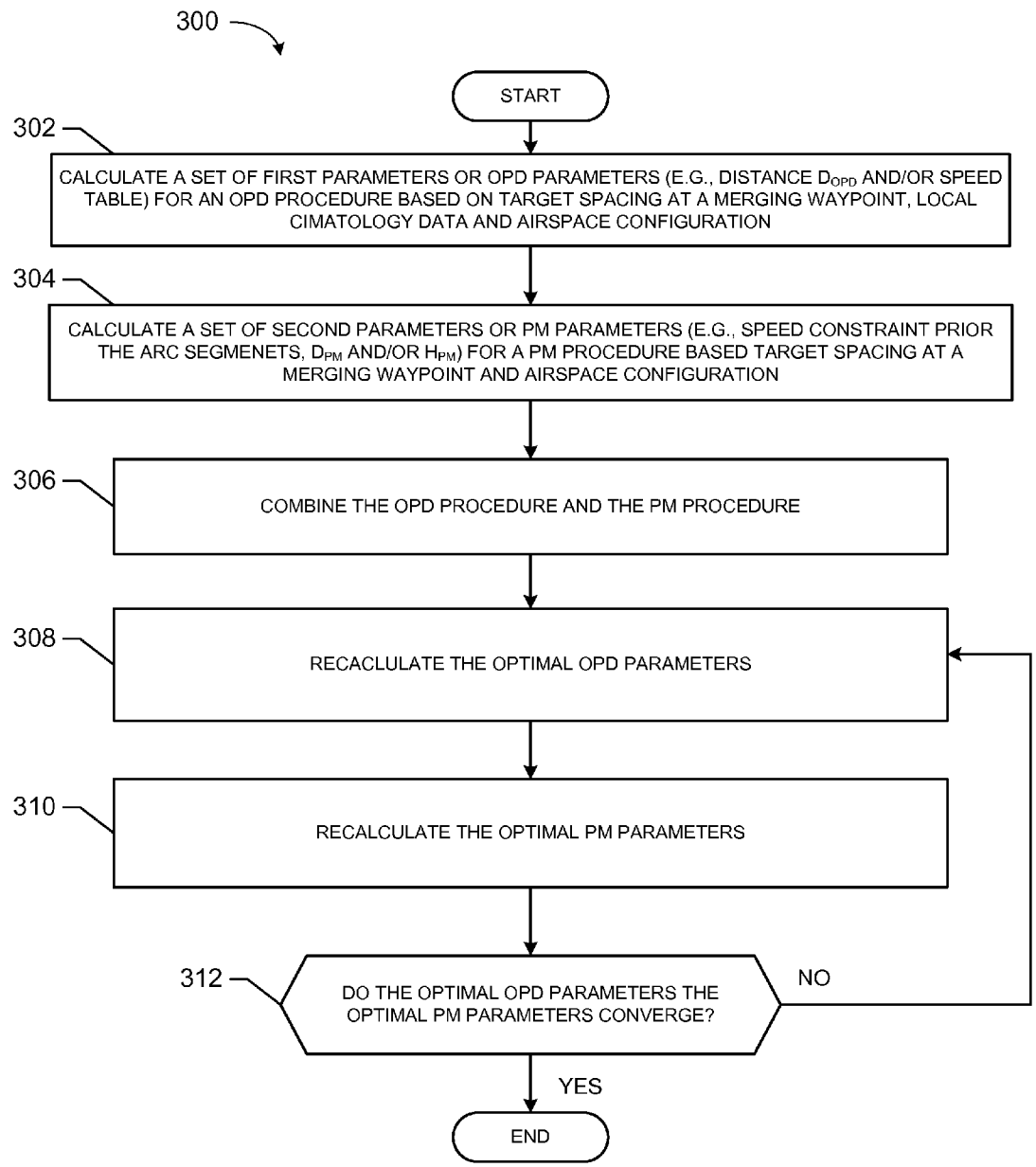
FIG. 6 a flowchart representing an example method that may be used to generate of parameters for the example aircraft arrival procedure of FIG. 4.

A flowchart representative of an example method for implementing the example flight management system 200 of FIG. 5 is shown in FIG. 6. In this example, the method may be implemented using machine readable instructions that comprise a program for execution by a processor such as the processor 412 shown in the example processor platform 400 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIG. 6, many other methods of implementing the example flight management system 200 may alternatively be used. For example, the order of execution of the blocks may be changed, and/or some of the blocks described may be changed, eliminated, or combined.

As mentioned above, the example method of FIG. 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 6 is a flowchart illustrating an example method 300 that may be implemented by the example flight management system 200 of FIG. 5 to control aircraft arrivals at a waypoint in accordance with the example procedure 100 of FIG. 4. The example method 300 includes calculating a set of first parameters or OPD parameters for an OPD procedure (block 302). The first parameters include a look up table or speed table of commanded speeds for different aircraft separations at a merging waypoint (e.g., the merging waypoint 120). The first parameters also include a distance $D_{OPD}$, which is the distance from a tie waypoint to the merging waypoint. For example, in the procedure 100 of FIG. 4, the distance $D_{OPD}$ is the distance between the tie way points 130, 140 and the merging waypoint 120.

In some examples, the calculation of the set of first parameters (block 302) is based on three inputs. However, in other examples, other secondary inputs may be included. A first input is target of spacing between aircraft at the merging waypoint. The second input is local climatology data. For example, several days of weather data (e.g., aloft winds and temperatures mainly) may be input. The third input is airspace configuration (e.g., a real (or realistic) sequence of traffic is employed). One or more of these inputs may affect the calculations of the parameters. For example, the larger the spacing that is imposed, the greater the decelerations that must be imposed upon aircraft in order to achieve the necessary target spacing. In the flight management system 200 of FIG. 5, for example, the OPD parameter calculator 202 is provided to determine the OPD parameters based on one or more of the target capacity and constraints input 204, the local climatology input 206 and the airspace configuration input 208.

In some examples, it is desirable to optimize the distance $D_{OPD}$ between the tie waypoints 130, 140 and the merging waypoint 120. Too short a distance between the tie waypoints 130, 140 and the merging waypoint 120 leads to poor OPD procedure performance because there is little room for the decelerations to elongate the spacing between aircraft. On the other hand, too long a distance between the tie waypoints 130, 140 and the merging waypoint 120 also compromises OPD procedure performance because uncertainties in weather and/or aircraft performance degrade the efficiency of early speed interventions.

In some examples, the method 300 includes running a set of fast-time traffic simulations with realistic aircraft flight plans, performance, and navigation using the inputs. In particular, the OPD parameters are determined based upon speed constraint prior to the tie waypoints 130, 140. The concept of the OPD procedure requires that all flights reach the tie waypoints 130, 140 at the same indicated airspeed, which can be accomplished, for example, by acceleration and/or deceleration by one or more aircraft. In some examples, this value is fixed, and is not changed throughout the simulations. In some examples, the resulting first parameters or OPD parameters are a set of speed (SPD) tables and an optimized $D_{OPD}$ for the OPD procedure. The speed tables indicate to the ATC how much a "trailing" aircraft should decelerate as a function of the distance of a "leading" aircraft to its own tie waypoint. Initially, approximate speed tables may be calculated for several values of $D_{OPD}$ using worst-case-scenario weather data. One simulation per value of $D_{OPD}$ is run. The optimal $D_{OPD}$ value is the one that leads to the minimum amount of conflicts. Once this is completed, the speed table of the optimal $D_{OPD}$ value is refined using simulation results. In the illustrated example, the altitude windows that define the optimized profile are determined statistically from the trajectories of all aircraft.

Once the OPD procedure parameters have been calculated (block 302), the example method 300 includes calculating a set of second parameters or PM parameters for a PM procedure (block 304). In some examples, the PM parameters are based upon two inputs. However, in other examples, the PM parameters can be based upon any number of suitable inputs (e.g., secondary inputs). A first input of the PM parameters is target of spacing at a merging waypoint (e.g., the merging waypoint 120), which may affect the PM parameter calculations. For example, the greater the spacing that is imposed, the greater the radius of arc trajectories (e.g., arc trajectories 150, 160) must be. The second input of the PM parameters is airspace configuration. In some examples, the airspace configuration is based on a real (e.g., or realistic) sequence of traffic is employed.

In some examples, the method 300 includes running a set of fast-time traffic simulations with realistic aircraft flight plans, performance, and navigation using the inputs. In some examples, the PM parameter calculations utilize weather data. There are three PM parameters that may be determined (block 304). A first PM parameter is speed constraint prior to the arc trajectories (e.g., the arc trajectories 150, 160). As disclosed, in some examples, aircraft should arrive at the tie waypoints 130, 140 at a fixed speed. In some examples, the PM procedure requires that all flights also reach the arc trajectories 150, 160 at the same indicated airspeed. In some examples, this value is fixed and is not changed throughout the simulations.

In order that both the speeds at the tie waypoints 130, 140 and upon arrival at the arc trajectories 150, 160 are fixed, while allowing variation of speed from aircraft to aircraft between those two locations in accordance with the initial OPD procedure as disclosed, the OPD procedure may include a final, relatively brief speed correction as each aircraft approaches the arc trajectories 150, 160. This final part of the flight from the tie waypoint 130, 140 to the arc trajectories 150, 160 can be relatively short because the distance required to decelerate to the fixed speed mandated at the arc trajectories 150, 160 can be relatively short (e.g., in comparison with the total distance from the tie waypoint 130, 140 to the arc trajectories 150, 160). For example, the total separation between the tie waypoints 130, 140 and the arc trajectories 150, 160 may be about 15-25 NM, depending upon the specific parameters/design.

The block deceleration distance over which aircraft decelerate, so as to arrive at the fixed speed (e.g., 210 knots) at the arc trajectories 150, 160, may be around 5 NM. Thus, aircraft speeds optimized for the OPD procedure may be maintained for the majority of the period (e.g., the distance) from the tie waypoints 130, 140 to the arc trajectories 150, 160. In some examples, it is anticipated that the relatively short period of deceleration to the fixed speed at the arc trajectories 150, 160 should be included in the overall OPD section calculations. In practice, this typically results in the tie waypoint 130, 140 being somewhat further from the merging waypoint 120 than otherwise to accommodate that final deceleration to the fixed speed.

A second PM parameter is the distance $D_{PM}$, which is the distance from the arc trajectories 150, 160 to the merging waypoint 120. This parameter is preferably optimized. For example, too short of a distance $D_{PM}$ leaves no room to de-conflict incoming traffic. However, too long a distance $D_{PM}$ leads to a substantial part of the arrival period being affected by the PM procedure, so that the drawbacks of the PM method (in terms of time and fuel efficiency) start to become an issue. The optimal value $D_{PM}$ should be larger (e.g., slightly larger) than that for which all conflicts are resolved.

A third PM parameter is altitude constraint $H_{PM}$ at the arc trajectories 150, 160. The altitude constraint $H_{PM}$ value is directly dependent on $D_{PM}$. In some examples, the arc trajectories 150, 160 are safely separated in distance, so one of the arc trajectories (e.g., the arc trajectory 150) is placed at a slightly different distance from the merging waypoint 120, to another of the arc trajectories (e.g., the arc trajectory 160). Also, in some examples the arc trajectories 150, 160 are separated by altitude. These altitudes are a product of the simulation, by statistically obtaining the average altitude profiles of all the flights. For example, in the flight management system 200 of FIG. 5, the PM parameter calculator 210 is provided to determine the PM parameters based on one or more of the target capacity and constraints input 204 and the airspace configuration input 212.

Once the preliminary OPD parameters and PM parameters have been independently determined (blocks 302, 304), the example method 300 includes combining the OPD and PM procedures (block 306). For example, in the flight management system 200 of FIG. 5, the combiner 214 combines the OPD and PM procedures using an iterative process.

The example method 300 includes recalculating the optimal OPD parameters by recalculating the OPD parameters (e.g., by repeating the simulations) with the PM parameters held fixed (block 308). In the system 500 of FIG. 5, for example, the OPD parameter optimizer 216 recalculates the optimal OPD parameters while fixing the PM parameters. The altitude and speed constraints from the PM parameters alter the OPD parameters such as, for example, the position of tie waypoints 130, 140 and the speed tables. The distance $D_{OPD}$ may, for example, increase to leave room for the PM arcs trajectories 150, 160. Additionally, the decelerations may be smaller because of the ability of the PM interventions to space aircraft before the merging waypoint 120. The optimization objective is to reduce fuel consumption while maintaining zero conflicts.

The example method 300 includes recalculating the optimal PM parameters by recalculating the PM parameters (e.g., by repeating the simulations) with the optimal OPD parameters (e.g., recalculated at block 308) held fixed (block 310). In the system 500 of FIG. 5, for example, the PM parameter optimizer 218 recalculates the optimal OPD parameters using the PM parameters held fixed. It is observed that the influence of the OPD parameters on the total parameter set (e.g., the OPD and PM parameters) reduces the potential conflicts prior to the introduction of the PM procedures (e.g., starting at distance $D_{PM}$ from the merging waypoint 120). Therefore, a reduced distance $D_{PM}$ is expected to eliminate all conflicts. The optimization objective is to reduce fuel consumption while achieving zero conflicts for these simulations and to limit the distance $D_{PM}$ because the shorter that distance $D_{PM}$, the less the overall impact on efficiency (e.g., because the influence on the total parameter set by the PM parameters is minimized).

The example method 300 includes determining whether the optimal OPD parameters and the optimal PM parameters converge (block 312). If the optimal OPD parameters and the optimal PM parameters do not converge (e.g., in accordance with a convergence criterion), the example method 300 includes recalculating the optimal OPD parameters while holding the optimal PM parameters fixed (block 308) and recalculating the optimal PM parameters while holding the optimal OPD parameters fixed (block 310).

Because the OPD and PM procedures are complementary, repeating the two steps of recalculating the optimal OPD parameters and the optimal PM parameters (blocks 308, 310) results in convergence of the OPD and PM parameters. Thus, the recalculations may be iteratively repeated until the first parameter set (e.g., the OPD parameters), the second parameter set (e.g., the PM parameters), and the optimization targets (e.g., the distance $D_{OPD}$ and the distance $D_{PM}$) do not change appreciably, that is, a convergence criterion for at least one and preferably all of the OPD and PM parameters, plus the distances $D_{OPD}$ and $D_{PM}$, is met. Then, the iterative process is halted, and the design of the example procedure is considered complete.

Although an example of the disclosure has been described by way of illustration, it is to be understood that this is in no way limiting and that various modifications will be apparent to the skilled person. For example, in the procedure disclosed above in connection with FIGS. 4, 5 and 6, the OPD parameters are calculated before the PM parameters, and then the OPD parameters are subsequently recalculated while holding the PM parameters constant before the PM parameters are recalculated. However, in other examples, the calculation orders are reversed and still arrive at a converged matrix of first and second parameter sets along with converged distances $D_{OPD}$ and $D_{PM}$. Similarly, although the distances $D_{OPD}$ and $D_{PM}$ can be measured relative to the merging waypoint 120, as illustrated in FIG. 4, in other examples the distances $D_{OPD}$ and $D_{PM}$ can instead be calculated from another point or points such as, for example, the tie points 130, 140. Moreover, it is to be understood that the term "waypoint" is not necessarily restricted to a point in space defined upstream of a terminus (e.g., an airport runway). The term "waypoint" may include the terminus itself. Because the merging waypoint is a defined (though not necessarily fixed) distance from the terminus, any calculations in accordance with examples of the present disclosure, relative to a merging waypoint, can be readily, linearly transposed relative to other fixed locations such as a terminus or runway in any event.

Figure 7:
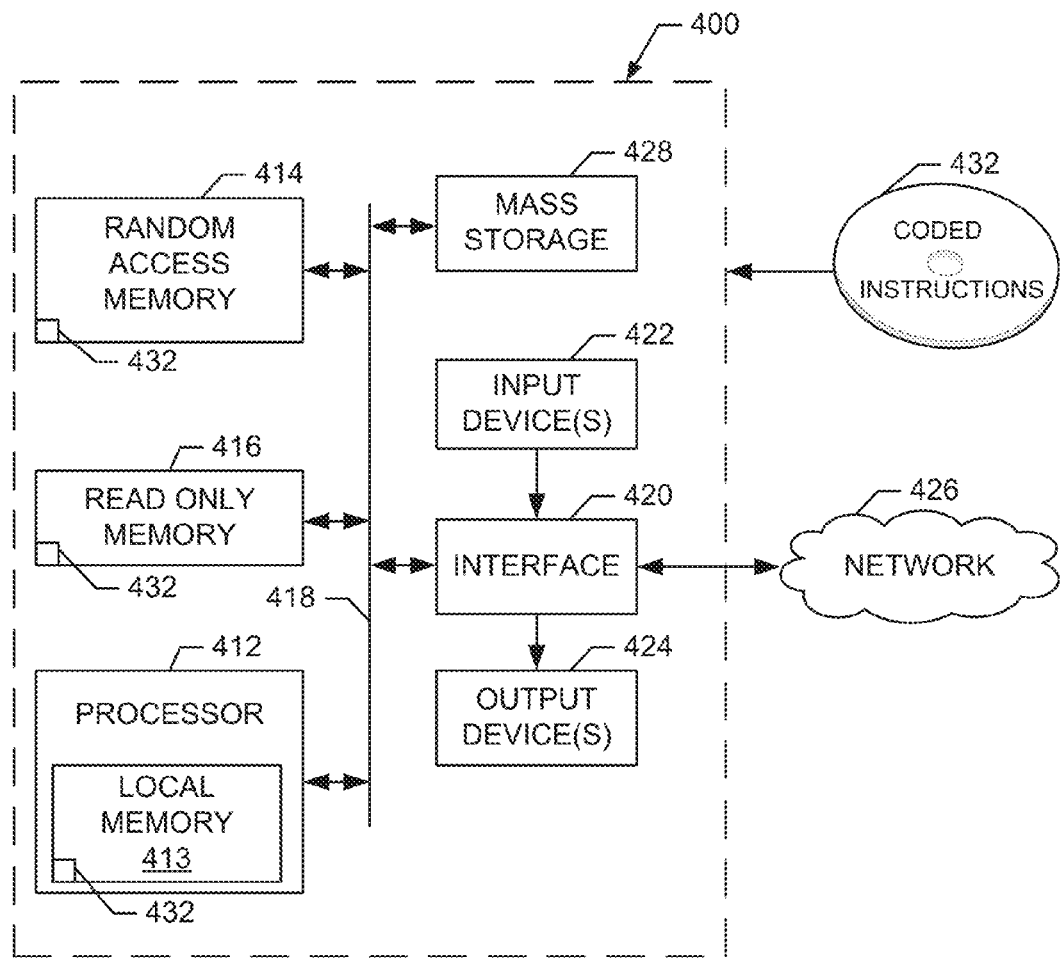
FIG. 7 is a diagram of a processor platform for use with the examples disclosed herein.

FIG. 7 is a block diagram of an example processor platform 400 capable of executing instructions to implement the method of FIG. 6 and the flight management system 200 of FIG. 5 to control aircraft arrivals at a waypoint in accordance with the example procedure 100 of FIG. 4 disclosed herein. The processor platform 400 can be, for example, a server, a personal computer, a mobile device (e.g., a cell phone, a smart phone, a tablet such as an iPad™), a personal digital assistant (PDA), an Internet appliance, or any other type of computing device.

The processor platform 400 of the illustrated example includes a processor 412. The processor 412 of the illustrated example is hardware. For example, the processor 412 can be implemented by one or more integrated circuits, logic circuits, microprocessors or controllers from any desired family or manufacturer.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), and/or a PCI express interface.

In the illustrated example, one or more input devices 422 are connected to the interface circuit 420. The input device(s) 422 permit(s) a user to enter data and commands into the processor 412. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 420 of the illustrated example, thus, typically includes a graphics driver card, a graphics driver chip or a graphics driver processor.

The interface circuit 420 of the illustrated example also includes a communication device such as a transmitter, a receiver, a transceiver, a modem and/or network interface card to facilitate exchange of data with external machines (e.g., computing devices of any kind) via a network 426 (e.g., an Ethernet connection, a digital subscriber line (DSL), a telephone line, coaxial cable, a cellular telephone system, etc.).

The processor platform 400 of the illustrated example also includes one or more mass storage devices 428 for storing software and/or data. Examples of such mass storage devices 428 include floppy disk drives, hard drive disks, compact disk drives, Blu-ray disk drives, RAID systems, and digital versatile disk (DVD) drives.

Coded instructions 432 to implement the method of FIG. 6 may be stored in the mass storage device 428, in the volatile memory 414, in the non-volatile memory 416, and/or on a removable tangible computer readable storage medium such as a CD or DVD.

Although certain example methods, apparatus and/or articles of manufacture have been disclosed herein, the scope of coverage of this patent is not limited thereto. On the contrary, this patent covers all methods, apparatus and/or articles of manufacture fairly falling within the scope of the claims of this patent.

What is claimed is:

1. A method of controlling aircraft arrivals at a merging waypoint, the method comprising:
defining a tie waypoint at a first distance from the merging waypoint;
generating a first parameter set of flight instructions for aircraft arriving at the tie waypoint, the first parameter set including an aircraft speed instruction for a target separation between a first aircraft arriving at a target waypoint downstream of the tie waypoint and a second aircraft arriving at the target waypoint;
defining a diversionary flight path at a second distance from the merging waypoint, wherein the second distance is less than the first distance; and
generating a second parameter set of flight instructions for the first aircraft arriving at the diversionary flight path, the second parameter set of flight instructions based on target aircraft capacity at the merging waypoint, the second parameter set including instructions for the first aircraft to follow at least a part of the diversionary flight path before flying to the merging waypoint, wherein a total flight path distance of the first aircraft is to increase when an expected arrival of the first and second aircraft at the target waypoint has a separation that is less than a threshold separation.

2. A method of controlling aircraft arrivals at a merging waypoint, the method comprising:
   defining a tie waypoint at a first distance from the merging waypoint;
   generating a first parameter set of flight instructions for aircraft arriving at the tie waypoint, the first parameter set including an aircraft speed instruction for a target separation between a first aircraft arriving at a target waypoint downstream of the tie waypoint and a second aircraft arriving at the target waypoint;
   defining a diversionary flight path at a second distance from the merging waypoint, wherein the second distance is less than the first distance;
   generating a second parameter set of flight instructions for the first aircraft arriving at the diversionary flight path, the second parameter set including instructions for the first aircraft to follow at least a part of the diversionary flight path before flying to the merging waypoint, wherein a total flight path distance of the first aircraft is to increase when an expected arrival of the first and second aircraft at the target waypoint has a separation that is less than a threshold separation; and
   performing an iteration of regenerating the first parameter set and regenerating the second parameter set to generate, respectively, modified first and second parameter sets of flight instructions that decrease fuel consumption of the first aircraft.

3. The method of claim 2 further comprising regenerating the first parameter set and the second parameter set until the first and second parameter sets of flight instructions meet a convergence criterion.

4. A method of controlling aircraft arrivals at a merging waypoint, the method comprising:
   defining a tie waypoint at a first distance from the merging waypoint;
   generating a first parameter set of flight instructions for aircraft arriving at the tie waypoint, the first parameter set including an aircraft speed instruction for a target separation between a first aircraft arriving at a target waypoint downstream of the tie waypoint and a second aircraft arriving at the target waypoint;
   defining a diversionary flight path at a second distance from the merging waypoint, wherein the second distance is less than the first distance;
   generating a second parameter set of flight instructions for the first aircraft arriving at the diversionary flight path, the second parameter set including instructions for the first aircraft to follow at least a part of the diversionary flight path before flying to the merging waypoint, wherein a total flight path distance of the first aircraft is to increase when an expected arrival of the first and second aircraft at the target waypoint has a separation that is less than a threshold separation; and
   after generating the second parameter set, redefining the tie waypoint and regenerating the first parameter set to decrease aircraft fuel consumption while maintaining a separation at the target waypoint that exceeds the threshold separation.

5. The method of claim 4 further comprising, after redefining the tie waypoint and regenerating the first parameter set:
   redefining the diversionary flight path and regenerating the second parameter set to optimize the aircraft fuel consumption while maintaining a separation at the target waypoint that exceeds the threshold separation.

6. The method of claim 5, further comprising:
   iteratively repeating redefining the tie waypoint and regenerating the first parameter set and redefining the diversionary flight path and regenerating the second parameter set until at least one of (1) redefining the tie waypoint and regenerating the first parameter set or (2) redefining the diversionary flight path and regenerating the second parameter set converge to meet a convergence criterion.

7. The method of claim 5, wherein the diversionary flight path and the second parameter set are fixed, and the first distance is redefined and the first parameter set is regenerated based on the fixed diversionary flight path and second parameter set.

8. The method of claim 7, wherein the redefined tie waypoint and the regenerated first parameter set are fixed, and the diversionary flight path is redefined and the second parameter set is regenerated based on the fixed redefined tie waypoint and regenerated first parameter set.

9. A method of controlling aircraft arrivals at a merging waypoint, the method comprising:
   defining a tie waypoint at a first distance from the merging waypoint;
   generating a first parameter set of flight instructions for aircraft arriving at the tie waypoint, the first parameter set including an aircraft speed instruction for a target separation between a first aircraft arriving at a target waypoint downstream of the tie waypoint and a second aircraft arriving at the target waypoint, wherein generating the first parameter set of flight instructions comprises generating a look-up table including a plurality of aircraft speeds for a plurality of separations between the first and second aircraft;
   defining a diversionary flight path at a second distance from the merging waypoint, wherein the second distance is less than the first distance; and
   generating a second parameter set of flight instructions for the first aircraft arriving at the diversionary flight path, the second parameter set including instructions for the first aircraft to follow at least a part of the diversionary flight path before flying to the merging waypoint, wherein a total flight path distance of the first aircraft is to increase when an expected arrival of the first and second aircraft at the target waypoint has a separation that is less than a threshold separation.

10. The method of claim 9, wherein the contents of the look-up table are generated based on target aircraft capacity at the merging waypoint.

11. The method of claim 10, wherein the contents of the look-up table are further generated based on simulations of a plurality of flights constrained by one or more of airspace configuration, weather conditions, altitude constraints, speed constraints, aircraft guidance or aircraft performance.

12. The method of claim 1, wherein the flight instructions are based on simulations of a plurality of flights, each of the flights constrained by one or more of the following:
   (a) the first distance from the tie way point to the merging waypoint;
   (b) the first parameter set of flight instructions for the aircraft arriving at the tie waypoint;
   (c) the second distance from the diversionary flight path to the merging waypoint; or
   (d) the second parameter set of flight instructions for the aircraft arriving at the diversionary flight path.

13. The method of claim 1, wherein the target waypoint is the merging waypoint.

14. A system comprising:
a processor coupled to a memory, the processor configured to execute instructions stored on the memory to:
calculate a tie waypoint at a first distance from a merging waypoint;
generate a first parameter set of flight instructions for a first aircraft and a second aircraft that arrive at the tie waypoint by generating a table including a plurality of commanded aircraft speeds for a plurality of spacings between the first and second aircraft, the first parameter set of flight instructions comprising aircraft speed instructions for the first and second aircraft;
calculate a diversionary flight path at a second distance from the merging way point, the second distance less than the first distance;
determine if the first and second aircraft are to arrive at the merging waypoint with a separation that is less than a threshold; and
generate a second parameter set of flight instructions for at least one of the first aircraft or the second aircraft to follow at least a portion of the divisionary flight path before flying to the merging way point when the separation is less than the threshold.

15. A system comprising:
a processor coupled to a memory, the processor configured to execute instructions stored on the memory to:
calculate a tie waypoint at a first distance from a merging waypoint;
generate a first parameter set of flight instructions for a first aircraft and a second aircraft that arrive at the tie waypoint, the first parameter set of flight instructions comprising aircraft speed instructions for the first and second aircraft;
calculate a diversionary flight path at a second distance from the merging way point, the second distance less than the first distance;
determine if the first and second aircraft are to arrive at the merging waypoint with a separation that is less than a threshold; and
generate a second parameter set of flight instructions for at least one of the first aircraft or the second aircraft to follow at least a portion of the divisionary flight path before flying to the merging way point when the separation is less than the threshold, wherein the processor is to calculate the tie waypoint by determining the diversionary flight path and calculating the second parameter set based on an optimized distance when the first aircraft and the second aircraft are expected to arrive at the merging waypoint with a separation that is less than the threshold, and using the determined diversionary flight and calculated second parameter set when calculating the tie waypoint.

16. The system of claim 14, wherein the plurality of commanded aircraft speeds for the plurality of spacings is based on at least one of target aircraft capacity at the merging waypoint, airspace configuration, current weather conditions, altitude constraints, speed constraints, aircraft guidance or aircraft performance.

17. The system of claim 14, wherein second parameter set of flight instructions is to cause the first aircraft to follow the divisionary flight path for a longer distance when the separation is less than the threshold.

18. The system of claim 14, wherein diversionary flight path is lateral to the merging waypoint.

\* \* \* \* \*